May 27, 1969 J. T. SIBILIA ET AL 3,447,141

MAGNETIC CIRCUIT WITH REVERSE DOMAIN PROPAGATION

Filed Nov. 12, 1965 Sheet 1 of 2

INVENTORS J. T. SIBILIA
D. H. SMITH
BY Herbert M. Shapiro
ATTORNEY

United States Patent Office 3,447,141
Patented May 27, 1969

3,447,141

MAGNETIC CIRCUIT WITH REVERSE DOMAIN PROPAGATION

John T. Sibilia, New Providence, and David H. Smith, Summit, N.J., assignors to Bell Telephone Laboratories, Incorporated, New York, N.Y., a corporation of New York Filed Nov. 12, 1965, Ser. No. 507,498
Int. Cl. G11b 5/00
U.S. Cl. 340—174 10 Claims

ABSTRACT OF THE DISCLOSURE

The demagnetizing field associated with a reverse domain being propagated along a first magnetic medium adds at various spaced apart positions along the medium to the propagation fields applied for propagating the domain. Another magnetic medium closely spaced to the first medium at one of those positions at which the fields add experiences a field in excess of its nucleation threshold providing a reverse domain therein. Various logical functions are provided.

This invention relates to information processing devices and, more particularly, to such devices of the magnectic type.

Magnetic information processing devices are well known in the art. Frequently, such devices employ an elongated medium along which information is propagated in the form of magnetized states. One such device is commonly known as a domain wall device. A domain wall device is characterized by a magnetic material capable of supporting reverse (magnetized) domains therein in response to a first field in excess of a nucleation threshold and of moving domains in response to a second field in excess of a propagation threshold but less than the nucleation threshold. Such second fields are provided, usually, in a varying pattern in spaced apart positions of the material for moving the domain along in a polyphase fashion.

Thin film domain wall devices have been disclosed as useful for various logic functions where information is transferred from one path to another. To this end, the thin films are deposited in patterns and operated in a rotational mode where a transverse field is utilized to direct the propagation of the domain along a different path offered by the geometry of a single film.

Devices including two magnetic media such as in magnetic wire domain wall devices including more than one wire do not permit the reorientation of propagation directions so readily permitted by single thin film counterparts. The primary reason for this is that the wires, for example, are simply not of a geometry to permit alternative propagation orientations. Yet magnetic wire domain wall devices offer a combination of suitable operating parameters and low cost which makes such devices very attractive.

An object of this invention is a new and novel magnetic wire domain wall logic device.

The invention is based on the realization that although polyphase propagation fields generated in spaced apart positions in a magnetic wire of necessity do not, in and of themselves, nucleate reverse domains therein, additional fields locally generated at selected spaced apart positions concurrently with those propagation fields increase the fields at those locations to values in excess of the nucleation threshold for nucleating reverse domains. This realization is turned to account in accordance with this invention by nucleating a reverse domain in a second magnetic wire spaced apart from a first wire which includes no reverse domain. Polyphase propagation means positioned between the wires generate propagation fields in changing spaced apart positions of the first and second wires. In response to the propagation fields, the reverse domain moves through the second wire but only negligible flux excursions result in the first. At prescribed positions, the demagnetizing field associated with the reverse domain advancing in the second wire and the pattern of propagation fields advancing that domain through the second wire add at ones of the spaced apart positions to exceed the nucleation threshold of the first wire. Accordingly, the spacing between the first and second wires is reduced at one of those positions to permit nucleation of the reverse domain in the first wire and the basic mechanism for logical functions between separate magnetic media is provided. Illustratively, AND, OR, and re-entrant circuits are described.

Accordingly, a feature of this invention is first and second spaced apart elongated magnetic media wherein the distance therebetween is reduced at a prescribed position where the demagnetizing field of a reverse domain in the first medium adds to the spaced apart fields for propagating that domain.

The foregoing and further objects and features of this invention will be understood more fully from a consideration of the following detailed description rendered in conjunction with the accompanying drawing wherein:

FIG. 1 is a schematic illustration of a logic circuit in accordance with this invention;

FIGS. 2, 3, and 4 are schematic illustrations of portions of the circuit of FIG. 1 showing magnetic fields thereabout;

Figure 1:
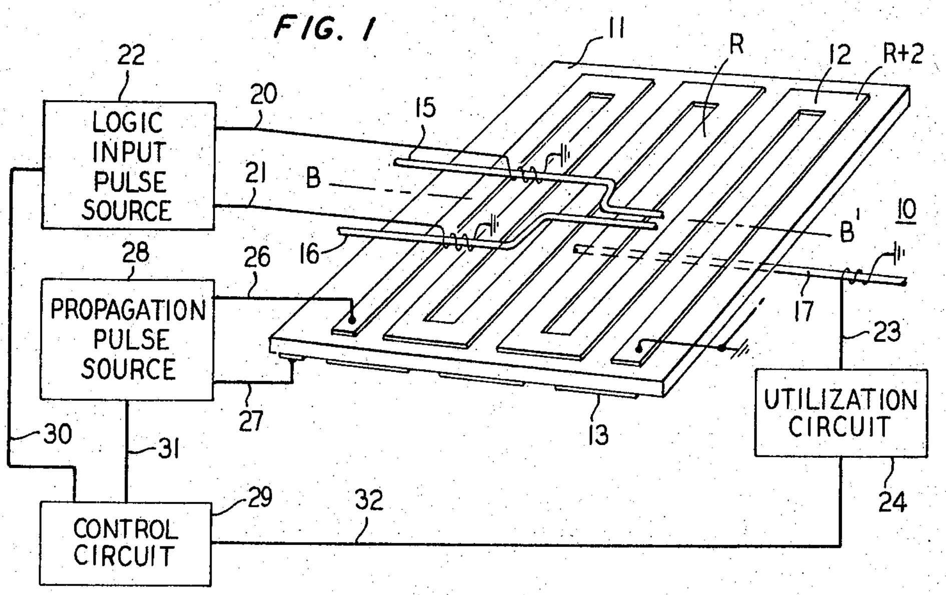

Specifically, FIG. 1 shows an AND circuit 10. The AND circuit comprises, conveniently, an insulating sheet 11 separating first and second conductors 12 and 13 which are grounded at one end. Conveniently, insulating sheet 11 comprises Mylar and conductors 12 and 13 are etched from copper coatings on opposite faces of the Mylar. The conductors form like patterns offset from one another to permit polyphase propagation of reverse domains along associated magnetic media as is well known. First and second magnetic wires 15 and 16 are positioned (by any suitable means) adjacent conductors 12. The wires 15 and 16, as shown, are spaced apart a distance to be magnetically independent of one another except at a leg, designated R, of conductor 12 where those wires are spaced very closely. A third magnetic wire 17 is arranged adjacent conductors 13 on the opposite face of insulating sheet 11 closely spaced from wires 15 and 16 at leg R of conductor 12.

Conductors 20 and 21 couple wires 15 and 16, respectively, and are connected between a logic input pulse source 22 and ground. An output conductor 23 couples conductor 17 and is connected between a utilization circuit 24 and ground. Conductors 26 and 27 are connected between conductors 12 and 13, respectively, and a propagation pulse source 28. Pulse sources 22 and 28, and utilization circuit 24 are connected to a control circuit 29 by means of conductors 30, 31, and 32, respectively. The various sources and circuits may be any such elements capable of operating in accordance with this invention.

Figures 2, 3, 4:
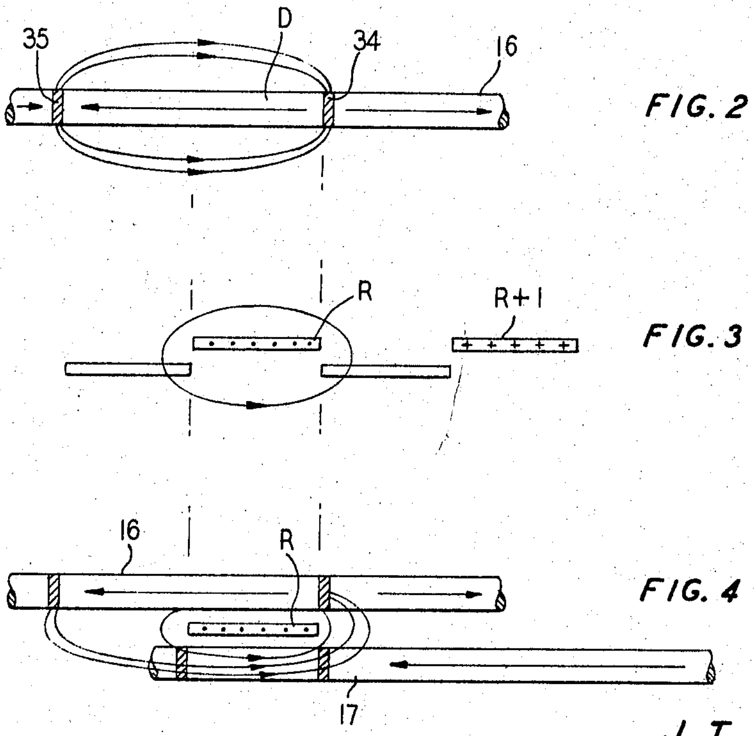

The operation of the circuit of FIG. 1 is described most easily in connection with FIGS. 2, 3, and 4 which represent cross sections of portions of the circuit of FIG. 1 taken along the line B–B′. For the purposes of this description, wires 15 and 16 are assumed initialized to a first (forward) direction of magnetization represented by arrows directed to the right in the representation of wire 16 in FIGS. 2 through 4. A reverse (magnetized)

domain is represented by an arrow directed to the left in wire 16 forming leading and trailing domain walls 34 and 35 (FIG. 2) with the forward domains.

A reverse domain, designated D in FIG. 2, having a magnetization direction represented by the arrow directed to the left in wire 16 of FIG. 2, has demagnetizing fields represented by the arrows directed to the right about the wire 16. A current flowing in a positive direction from propagation pulse source 28 through conductors 26 and 12 to ground flows downward and to the left on leg R of conductor 12 as shown in FIG. 1 and upward and to the right in the next adjacent leg of conductor 12 designated leg $R+1$ in FIG. 3. The current flow is indicated by dots and plus signs in the cross-sectional representations of legs R and $R+1$ in FIG. 3. Current, flowing as described in leg R, generates a magnetic field counterclockwise thereabout as viewed in FIG. 3. Such a field is indicated by the undesignated closed arrow about leg R in FIG. 3.

FIG. 4 shows wire 16 and leg R of conductor 12, and wire 17 positioned on the other side of the insulating sheet (not shown here). Importantly, the magnetic field as shown in FIG. 3 about leg R and the demagnetizing field about a reverse domain as shown in FIG. 2 add to provide a magnetic field to the right in wire 17 as viewed in FIG. 4. For AND circuit operation, the operating parameters are so chosen that the magnetic field about conductor R and the demagnetizing field about reverse domain D are insufficient to nucleate a "reverse" domain in wire 17, a reverse domain in conductor 15 also being required for such nucleation. It is to be noted that a "reverse" domain on wire 17 is magnetized in a direction opposite to that in which a reverse domain in wire 16 (or 15) is magnetized. Wire 17 is assumed initialized to a forward direction opposite to that in which wires 15 and 16 are initialized, that is, in a direction represented by an arrow directed to the left in wire 17 as shown in FIG. 4.

Figure 5:
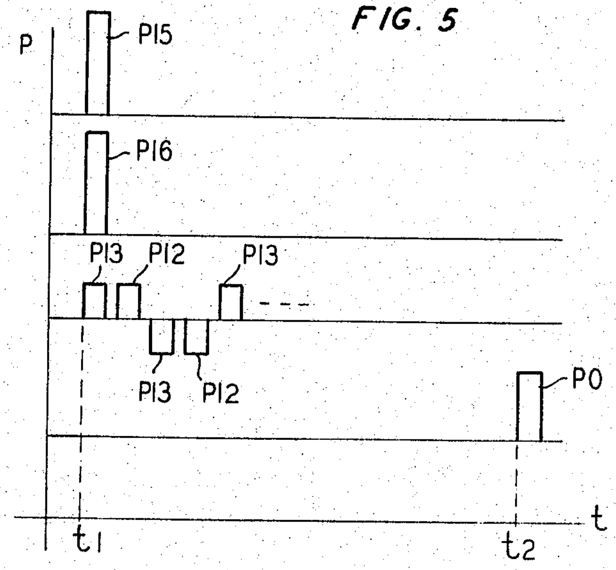
FIG. 5 is a pulse diagram for the operation of the circuit of FIG. 1.

In operation, then, logic input pulse source 22 pulses conductors 20 and 21, under the control of control circuit 29 for nucleating reverse domains in each of wires 15 and 16. These pulses designated P15 and P16 are shown as applied at a time $t1$ in the pulse diagram shown in FIG. 5. Propagation pulses designated P12 and P13 in FIG. 5 are initiated, illustratively, at time $t1$ via propagation pulse source 28 under the control of control circuit 29. A reverse domain is generated in wire 17 and propagated therealong for inducing a pulse in conductor 23, designated Po in FIG. 5, at a time $t2$. The pulse in conductor 23 is detected by utilization circuit 24 under the control of control circuit 29.

It is clear that for AND operation the demagnetizing field about a reverse domain in wire 15 or wire 16 in addition to the propagation field about leg R of conductor 12 is insufficient to nucleate a reverse domain in wire 17. Thus in the absence of a reverse domain in either of wires 15 or 16 no pulse is generated in conductor 23 at time $t2$. The coercive force of the material of wire 17 may be chosen higher than the coercive force of the materials of wires 15 and 16 to insure such operation. Copending application Ser. No. 405,692, filed Oct. 22, 1964, now Patent No. 3,350,199, for D. H. Smith and E. M. Tolman discloses particularly suitable materials. Other materials are well known. Alternatively, the demagnetizing fields about reverse domains in wires 15 and 16 may be chosen relatively weak by lengthening the reverse domain (widen the legs of conductors 12 and 13). As illustrated, reverse domains are propagated through all the magnetic wires by the same propagation conductors (solenoids). Thus, domain lengths are alike in all the wires 15, 16, and 17. Such an arrangement is not required, however, different propagation means being useful in some implementations.

Figure 6:
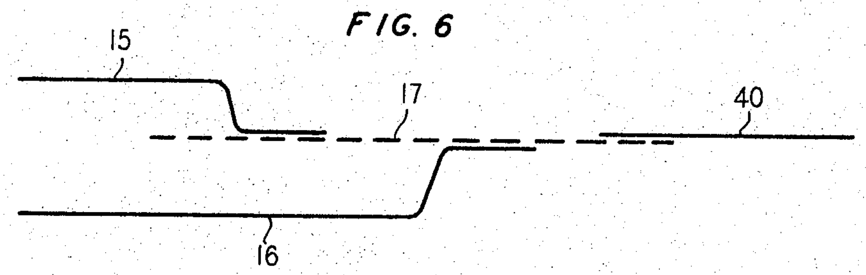
FIGS. 6 and 7 are schematic illustrations of additional logic circuits in accordance with this invention.

The demagnetizing fields about a reverse domain need not be limited in accordance with this invention. For example, a single strong demagnetizing field, in addition to a propagation field, is, advantageously, suitable for nucleating a reverse domain in an adjacent magnetic wire for providing an OR function. FIG. 6 shows a schematic arrangement of such an OR circuit. Consider, for example, that wire 16 of FIG. 1 were moved to the right, as viewed, overlying leg $R+2$ of conductor 12. Then a top view of FIG. 1 would appear as shown in FIG. 6, the magnetic wires being represented there as correspondingly designated lines. Line 17 is broken to indicate that it is beneath the insulating sheet (not shown). Then, a single reverse domain in wire 15 or wire 16 nucleates a reverse domain in wire 17 in the manner described. The reverse domain may be read out of wire 17 as described in connection with FIG. 1 or may be transferred to an additional wire 40 on the same face of the insulation as wires 15 and 16. Various elements for the operation of the circuit of FIG. 6 are essentially as described in connection with FIG. 1 and are not further described. The same OR circuit operation may be achieved even if wires 15 and 16 are not spaced apart, that is, in the physical arrangement shown in FIG. 1.

Figure 7:
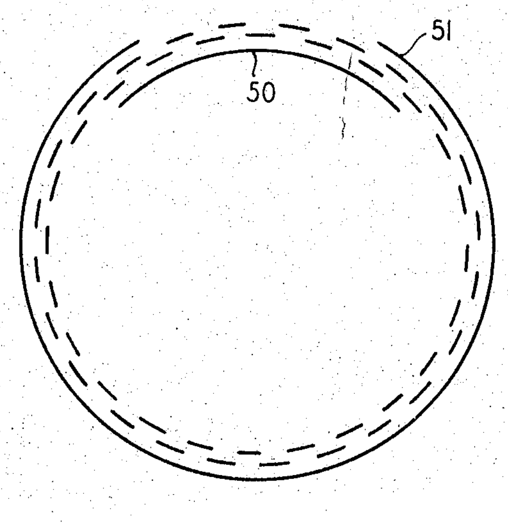

The superposition of a single demagnetizing field of a reverse domain and a propagation field also permit reentrant shift register operation with domain wall devices. FIG. 7 shows one such register with a first magnetic wire 50 bridging the spaced apart ends of another magnetic wire 51. Propagation solenoids are indicated by the broken curves 52 and 53, operation being entirely analogous to that of the circuit of FIG. 1.

What has been described is considered to be only illustrative of the principles of this invention. Accordingly, various modifications may be made therein by one skilled in the art without departing from the scope and spirit of the invention.

What is claimed is:

1. In combination, first and second media, each of said media comprising a magnetic material capable of supporting therein a reverse domain with an associated demagnetizing field in response to a first field in excess of a nucleation threshold and of moving that reverse domain therein in response to a second field in excess of a propagation threshold and less than said nucleation threshold, first means for providing said first field in a portion of said second medium for nucleating a reverse domain there, second means for providing oppositely poled said second fields in alternating first and second spaced apart portions of said first and second media for propagating reverse domains therethrough, and means for positioning said first and second media close to one another at a position therealong where said demagnetizing field about said reverse domain in said second medium and said second field add to exceed the nucleation threshold of said first medium for nucleating a reverse domain there.

2. A combination in accordance with claim 1 wherein said magnetic media comprise magnetic wires.

3. A combination in accordance with claim 2 including detection means coupled to a second position of said first wire remote from said first position.

4. A combination in accordance with claim 3 including a third magnetic wire adjacent said first position and means for selectively providing stable magnetic conditions in said second and third wires, stable conditions being required in both said second and third wires for providing said first field at said first position of said first wire.

5. A combination in accordance with claim 3 including a third magnetic wire adjacent said first wire at a third position therein, and means for selectively providing a stable condition in said second or third wires, said polyphase means being arranged and operated in such a manner to superpose a magnetic field with said demagnetizing field at said first and third positions of said first wire for providing a stable condition there.

6. A combination in accordance with claim 2 wherein said detection means comprises a portion of said second wire.

7. In combination, first and second wires, each of said wires comprising a magnetic material capable of supporting therein a reverse domain with an associated demagnetizing field in response to a first field in excess of a nucleation threshold and of moving that reverse domain therein in response to a second field in excess of a propagation threshold and less than said nucleation threshold, first means for providing said first field in a portion of said second wire for nucleating a reverse domain there, second means for providing oppositely poled said second fields in alternating first and second spaced apart portions of said first and second wires for propagating reverse domains therethrough, and means for positioning said first and second wires close to one another only at a position therealong where said demagnetizing field about said reverse domain in said second wire and said second field add to exceed the nucleation threshold of said first wire for nucleating a reverse domain there.

8. A combination in accordance with claim 7 including a third wire comprising said magnetic material, said second means being operative on reverse domains in said third wire, means for providing said first field in a portion of said third wire, and means for positioning said third wire close to said first wire at a position therealong where the demagnetizing field about a reverse domain in said third wire and said second field add to exceed the nucleation threshold of said first wire for nucleating a reverse domain there.

9. A combination in accordance with claim 7 including a third wire comprising said magnetic material, said second means being operative on reverse domains in said third wire, means for providing said first field in a portion of said third wire, and means for positioning said third wire close to said first and second wires only at said last-mentioned position.

10. A combination in accordance with claim 9 wherein said demagnetizing field about a reverse domain in each of said second and third wires is necessary for exceeding the nucleation threshold of said first wire.

References Cited

UNITED STATES PATENTS

| | | | |
|---|---|---|---|
| 3,137,845 | 6/1964 | Snyder | 340—174 |
| 3,295,114 | 12/1966 | Snyder | 340—174 |
| 3,299,413 | 1/1967 | Snyder | 340—174 |
| 3,366,936 | 1/1968 | Snyder | 340—174 |

BERNARD KONICK, *Primary Examiner.*

BARRY L. HALEY, *Assistant Examiner.*

U.S. Cl. X.R.

307—88